United States Patent [19]

Spence

[11] 4,236,104

[45] Nov. 25, 1980

[54] POSITION SENSING ROTARY SWITCH AND SYSTEM

[75] Inventor: Daniel G. Spence, Fullerton, Calif.

[73] Assignee: Rockwell International Corporation, El Segundo, Calif.

[21] Appl. No.: 970,908

[22] Filed: Dec. 19, 1978

[51] Int. Cl.³ .............................................. G05B 19/10
[52] U.S. Cl. .................................... 318/567; 318/602; 318/673; 307/41; 200/11 D; 200/14; 200/17 R
[58] Field of Search ...................... 318/673, 602, 567; 200/11 D, 14, 17 R; 307/41

[56] References Cited

U.S. PATENT DOCUMENTS

| | | | |
|---|---|---|---|
| 2,958,028 | 10/1960 | Smith | 318/602 |
| 3,092,254 | 6/1963 | Germen | 318/673 |
| 3,673,393 | 6/1972 | Schober | 318/673 |
| 3,863,079 | 1/1975 | Calabrese | 200/11 D |

*Primary Examiner*—Gene Z. Rubinson
*Assistant Examiner*—Eugene S. Indyk
*Attorney, Agent, or Firm*—H. Fredrick Hamann; Wilfred G. Caldwell

[57] ABSTRACT

The switch of the invention is a double deck type rotary switch having a position deck for detecting a home position and means for determining each position of the switch relative to the home position. A switching deck, rotated together with the position deck, selectively applies operating voltage to a plurality of operative devices, such as sprinkling valves.

The system incorporates a microprocessor to control a motor for driving the rotary switch to a commanded position. The position deck signals the microprocessor as the deck reaches the predetermined position and the processor provides a delay before applying voltage to the switching deck, insuring that good load contact is made, so that arcing is avoided. The switching deck makes its load contact a few degrees ahead of the position deck in order that the load contacts for the work voltage are in the center of their terminal spring clips before the microprocessor is signaled that the predetermined position has been attained.

A common operating line from the microprocessor to the switching deck includes a single valve driver for use with any one of the plurality of valves.

3 Claims, 11 Drawing Figures

POSITION SENSING ROTARY SWITCH AND SYSTEM

BACKGROUND OF THE INVENTION

1. Field of the Invention

The present invention relates in general to the field of electrical switching, and more particularly to computer compatible position signaling by a rotary switch also making selective load connections.

2. Prior Art

U.S. Pat. No. 2,821,580 to Black discloses a multiple-deck switch having a first deck to provide current switching and an auxiliary heavy-current carrying contact set that is synchronized to the main switching contacts to absorb only the high current transient during switching.

U.S. Pat. No. 2,678,985 to Smith, Jr. shows a multiple deck rotary switch having pairs of angularly set rotors to provide a make before break function.

U.S. Pat. No. 3,962,642 to Kitamura et al is a typical television tuner switch wherein arrays of concentric contacts are provided for signaling indications of rotary switch position.

U.S. Pat. No. 3,800,106 to Simmons discloses adjustable rotors in an adjustable deck rotary switch such that the various rotors may switch different circuits with predetermined timed relationships.

SUMMARY OF THE INVENTION

The position sensing rotary switch of the invention comprises a position deck for detecting a home position and detecting each position of the switch relative to the home position; and a switching deck for selectively applying operating voltage to a plurality of devices.

Features of the invention reside in the provision of an offset between the position deck and the switching deck to insure that the selective switching contacts are made before the position indication contacts are made to indicate the selected position.

Another feature of the invention resides in the use of a common driver for all devices. A computer or microprocessor drives a motor which rotates the switch to a predetermined commanded position. Thereafter, the computer applies the operating voltage to the device via the common driver and the switching deck.

A further feature of the invention resides in the provision of a system wherein the selected position is made and verified; the motor is stopped, and then the current is applied to the operating devices. After the device has performed its predetermined amount of work, the current to the device is eliminated and thereafter the motor is started to drive the rotary switch from the predetermined contacts, usually to home position which is the normal starting position. This prevents the switch from breaking the current, thus increasing switch contact life.

BRIEF DESCRIPTION OF THE DRAWINGS

The invention will be better understood from a reading of the following detailed description thereof when taken in light of the accompanying drawings wherein.

DESCRIPTION OF A PREFERRED EMBODIMENT

The switch and system of the present invention has many industrial uses, particularly in the selective or sequential control of separate operating devices. However, for ease of description, the devices will be presented as sprinkling valves and the system as an industrial controller for the selective operation of a plurality of such sprinkler valves.

Figure 1:
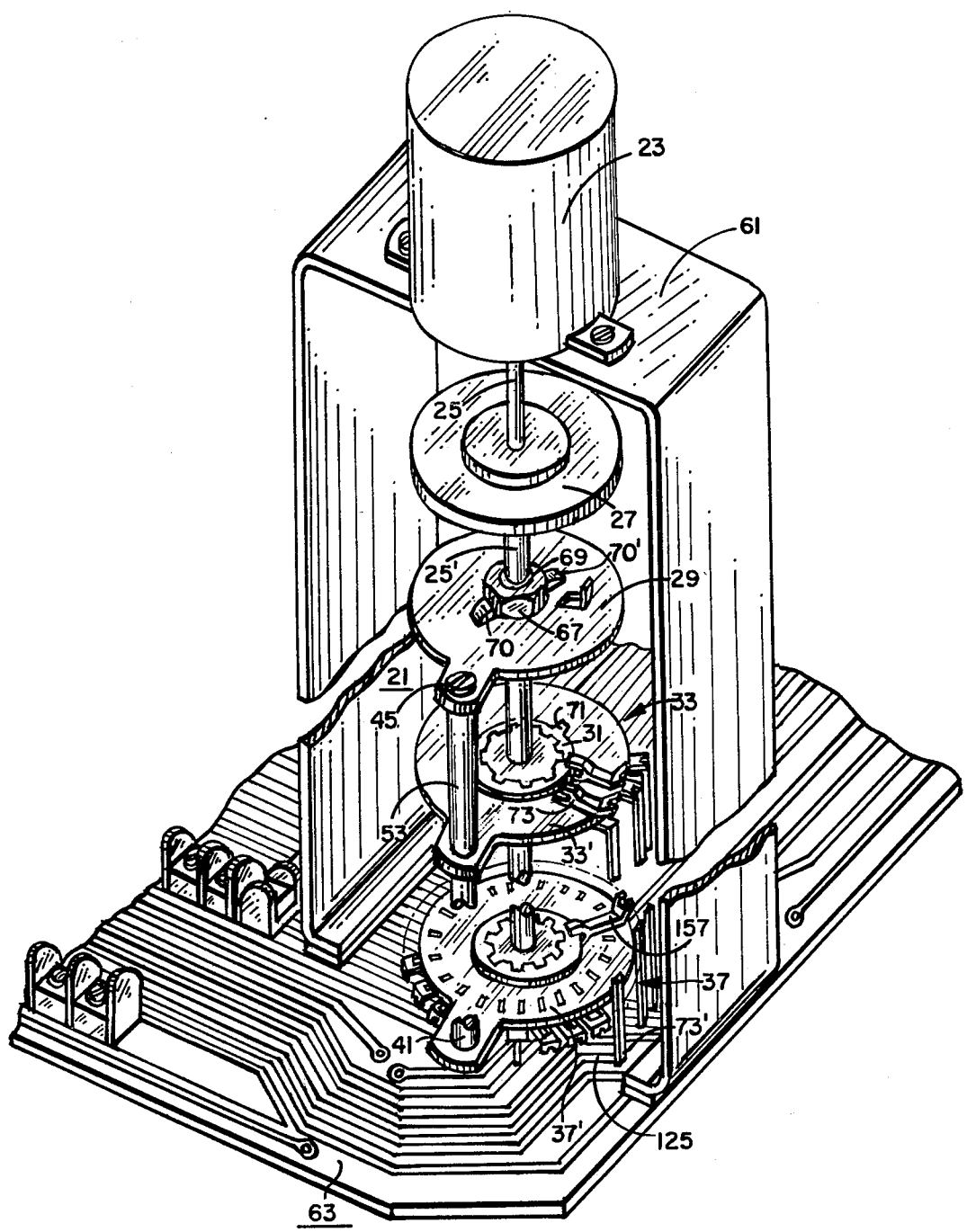
FIG. 1 is a view in perspective of the position sensing rotary switch of the present invention mounted on a circuit board and equipped with motor drive.

Referring to FIG. 1, the rotary positioning switch is generally shown at 21, being driven by DC motor 23 via motor shaft 25, and its own shaft 25', joined together by coupler 27. Shaft 25' penetrates upper support plate 29 to engage central rotary conductor 31 of the position deck 33 and rotary conductor 35 of the switching deck 37.

Figure 2:
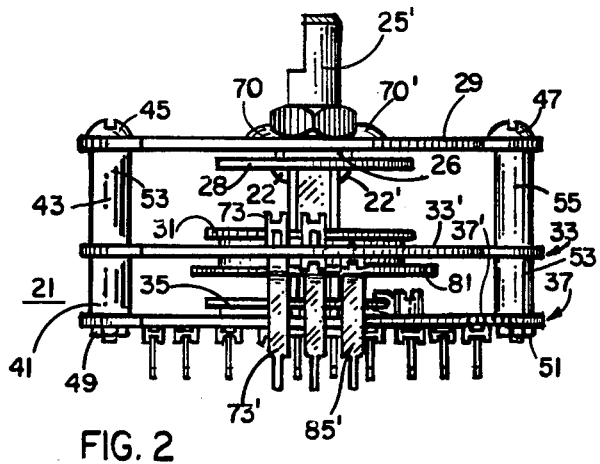
FIG. 2 is a view in side elevation of the rotary switch, per se.

The supporting structure for the switch 21 may best be seen from FIGS. 1 and 2 where the wafers 33' and 37' are spaced apart by spacers 41 and 43 carried on screws 45 and 47 fastened by nuts 49 and 51. Also included on these nuts are these spacers 53 and 55 between the wafer 33' and the upper supporting plate 29.

In FIG. 1, it may be seen that the motor 23 is carried on U-shaped bracket 61 supported from a printed circuit board 63 which provides connections with the various switching stations, as described infra. The motor shaft 25 has a small diameter and it is coupled to the large rotary switch driving shaft 25' by the plastic coupler 27 to comprise a rigid driving connection.

The shaft 25' is retained in position in switch 21 by collar 67 held against vertical movement in the upper direction by split ring 69 and against rotation by the raised positions 70, 70' (FIG. 2) formed from the material of the support plate 29. It is held against vertical movement in the downward direction by being crimped itself at 22, 22' beneath the unused disc 28 spaced below support plate 29 by washer 26.

The function of position deck 33 is to provide an indication of how many position numbers its rotary conductor 31 has moved from a home position. A single conductive tab 71 on the conductive portion of rotor 31 slides against spring clip or contact 73, as pictured in FIG. 3 to define the home position. The home position is position No. 1 on the position deck. Contact 73 is electrically in connection with depending circuit board terminal 73' through wafer 33'.

Figure 3:
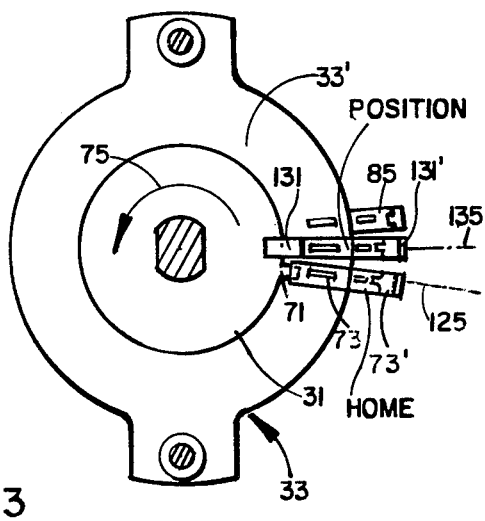
FIG. 3 is a top plan view of the upper deck of the switch of FIG. 2.
Figure 4:
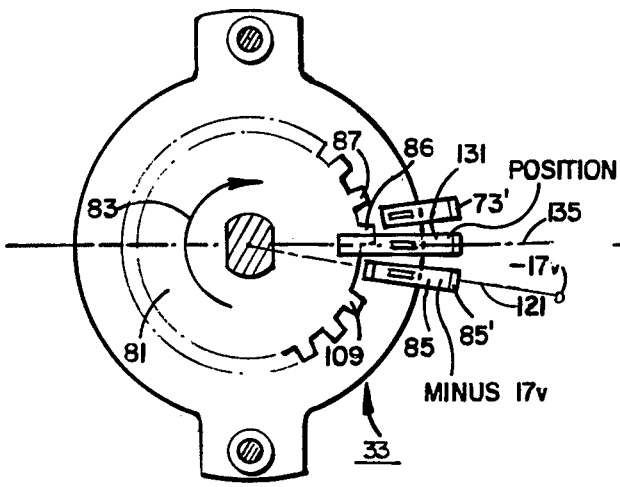
FIG. 4 is a bottom plan view of the upper deck of the switch of FIG. 2.

The motor 23 drives its shaft 25 in a counter clockwise direction and, accordingly the rotary conductor 31 turns in a counter clockwise direction, as shown by the arrow 75 in FIG. 3. Simarily, a separate second or lower rotary conductor 81 of position deck 33 turns in a counter clockwise direction, as viewed from its underneath side, and as indicated by the arrow 83 in FIG. 4. The position indicating switch arm or terminal contact 85 is provided to receive the teeth-like tabs 86, 87,–109 of rotary conductor 81. Tooth-like tab 86 is positioned for subsequent contact with clip 85, and it will be noticed that a void occurs between tooth-like tabs 86 and 109 which accounts for the home position (No. 1), shown in FIG. 3. Hence, movement of rotary conductor 31 to position No. 2 is indicated by contact of tooth-like tab 86 and spring clip or terminal contact 85 (FIG. 4). Position No. 3 is indicated by contact of tooth-like tab 87 with terminal 85 etc. until some 12 or 24 or other selected numbers of predetermined positions, depending on the numbered tabs, have been attained.

Another feature of the invention resides in the design of the position sensing circuitry, permitting every position of the switch to be operatively useful, i.e. home position is also position No. 1, as will be seen hereinafter.

Figure 8:
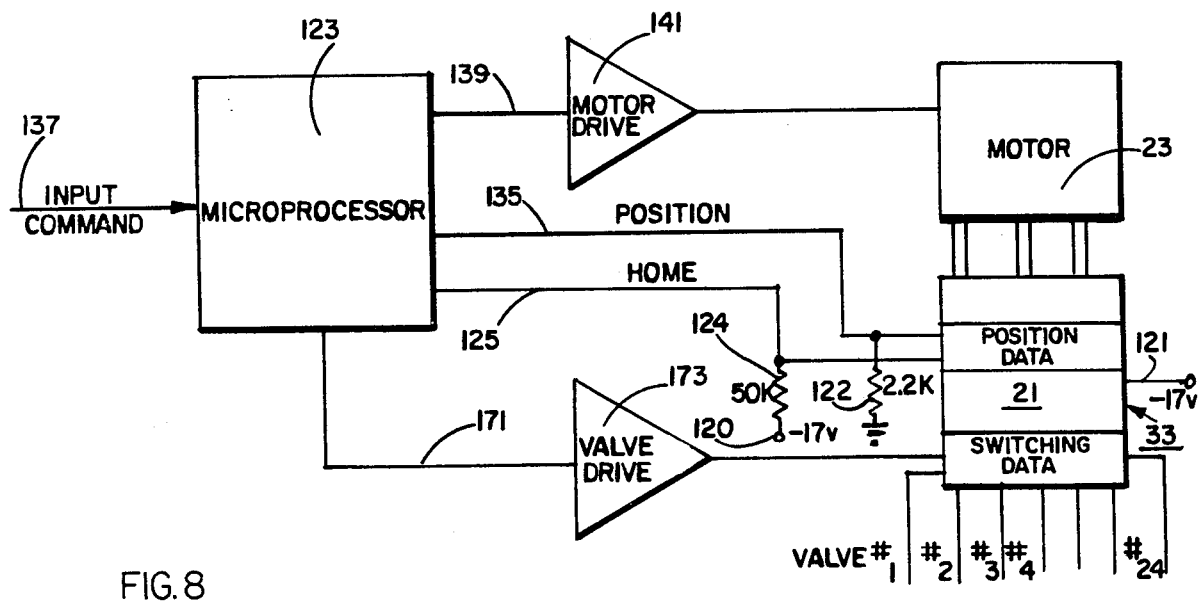
FIG. 8 shows a block diagram of a position sensing rotary switch system.

The position indication circuitry is shown by the use of FIGS. 3 and 4, in conjunction with FIG. 8, wherein a position signal lead 135 is seen between computer or microprocessor 123 and position deck 33, along with a home position signal lead 125. The home signal lead 125 (see also FIG. 1) extends to the clip terminal contact 73, 73' so that a circuit is completed from the position clip 131 to the home clip 73 through the conductive tab 71. This causes the potential of the home and position clips to be driven close to ground or zero volts through the resistor divider circuit 122–124, now connected together, thus indicating to the microprocessor 123 that the home position has been reached.

When the rotary switch 21 is moved from home position, the home signal potential returns to $-17$ volts (applied at terminal 120 of FIG. 8) through 50 K resistor 124, and voltage signals are applied to the position signal lead 135, which is connected to spring clip terminal 131, so that each time a tooth 86–109 makes contact with terminal 85, a path is completed via the conductive portion of rotary conductor 81 from clip terminal 85 (which is connected to $-17$ volts over lead 121, (see also FIG. 8) to the position spring clip terminal 131 which is connected to ground over 2.2 K resistor 122. Hence a signal is developed for each tooth-like tab 86–109 as it passes beneath terminal 85 and the microprocessor 123 simply recognizes the home position signal (ground) and counts sequentially 2, 3 etc. for each position signal to determine which position the rotary switch is making.

The input command shown applied to lead 137 (FIG. 8) for microprocessor 123, may, for example specify that rotary switch 21 be driven to position No. 7. The microprocessor 123 then merely counts the position signals to 7 and stops motor 23 on that position for the desired length of time. This circuit is by way of lead 139 and motor driver 141 to motor 23 from microprocessor 123. If the microprocessor then finishes its business at position No. 7, and commands a return to position No. 1 (home), the microprocessor simply looks for the home position signal to return to ground or zero volts.

The switching deck 37 (FIGS. 5 and 8) applies the heavy AC voltage to the valve devices to be operated and is simultaneously driven with the position indicating deck 33.

Figure 5:
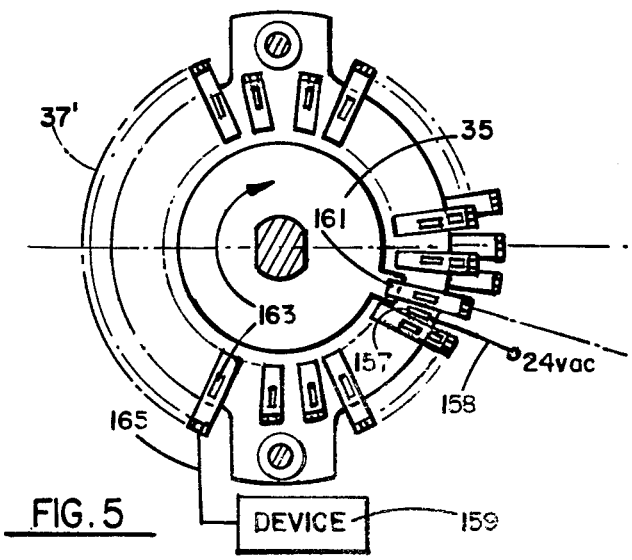
FIG. 5 is a bottom plan view of the lower switching deck of the switch of FIG. 2.

Thus, in FIG. 5, it may be seen that the spring clip or input terminal contact 157 (See FIG. 1) is connected over lead (FIG. 5) to a 24 volt AC source powering the devices, such as device 159. The sliding contact of clip 157 with rotary conductor 35 (FIG. 1) provides the 24 volt AC available at its tab 161, which is seen on the lower side of deck 37 in FIG. 5. Hence, if the microprocessor command is to go to position 7, the tab 161 makes contact with No. 7 spring clip 163 (FIG. 5) to energize device 159 over lead 165.

This energization is seen in FIG. 8 as occuring over common energization lead 171 for valve driver 173 and via the switching deck 37 to any of the valve leads 1, 2, 3, 4 etc.–24.

Figure 9:
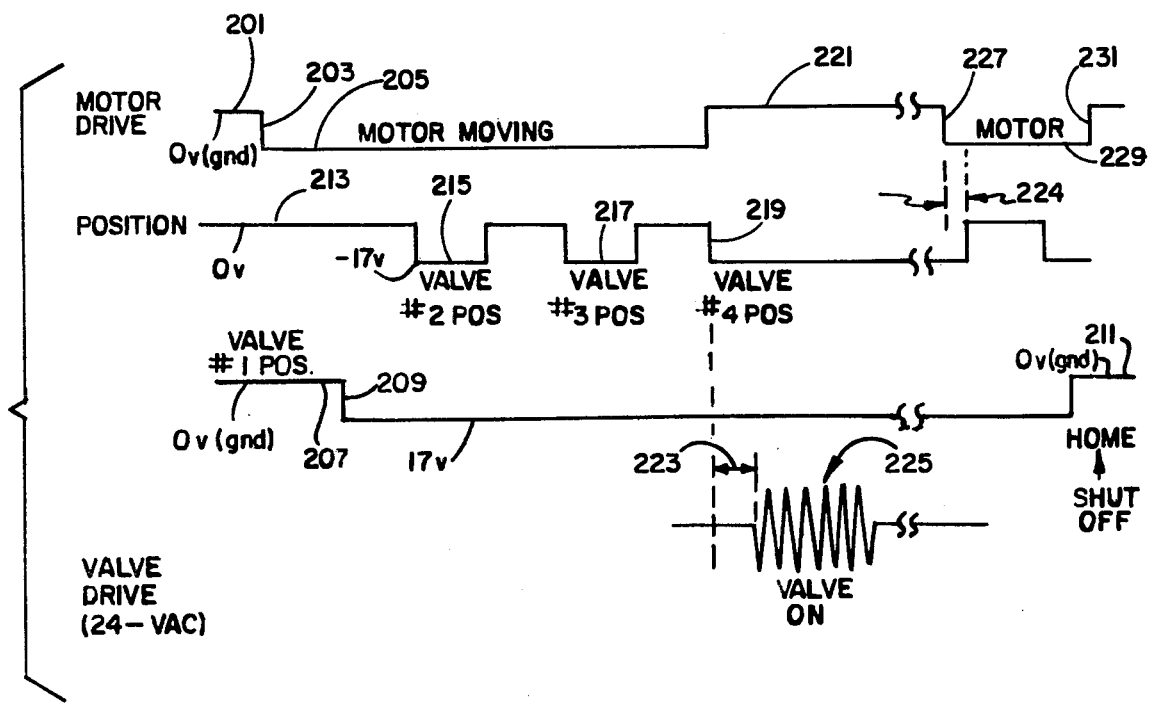
FIG. 9 is a timing chart for the operation of the system of FIG. 8.

The operation of the rotary switch 21 with respect to motor drive, position drive, home sensing and valve driving is best seen in FIG. 9 wherein a line 201 indicates that the motor is idle, and line 203 shows the motor switching from idle to the motor moving level 205. The command is energize valve No. 4.

The position line shows valve No. 2 position, valve No. 3 position, valve No. 4 position and the home line shows valve No. 1 position.

Thus, the switch remains on home position, as indicated by the home line 207 until it moves off at 209. Home position is not sensed again until the region 211, after the position deck 33 has been entirely rotated. This sensing signals microprocessor 123 to stop motor 23 awaiting a further command if none has been stored.

From position line 213 it may be seen that valve position No. 2 is passed at 215, valve position No. 3 is passed at 217, and valve position No. 4 is attained at 219. The motor is stopped, as shown at level 221, and after a delay indicated by the double ended arrow 223, the valve is turned on as shown by the AC voltage wave 225. After a predetermined time of utilization of the valve load, as for watering at a particular location, the valve is turned off and thereafter followed by a delay, the motor is caused to start moving at 227. It may be seen that it moves along the length 229 until it reaches home position at 231, corresponding to home position 211 where it stops, and the microprocessor awaits the next command.

Figure 10:
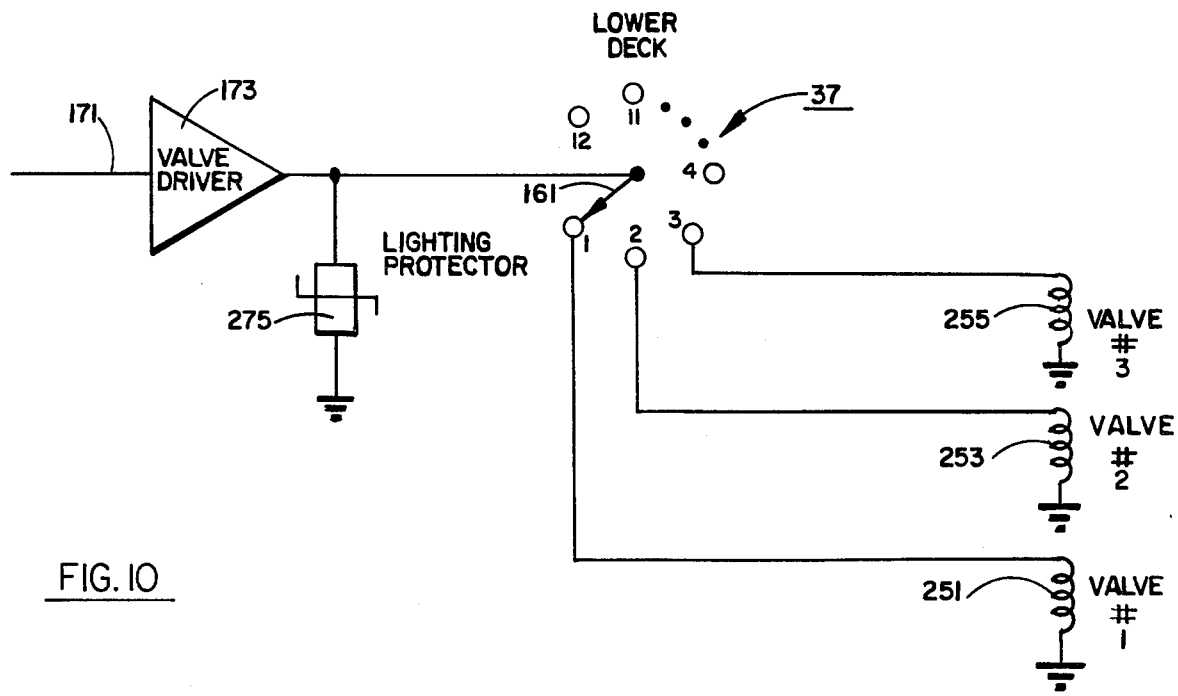
FIG. 10 is a circuit diagram showing the manner of employing a single driver for a plurality of devices.
Figure 11:
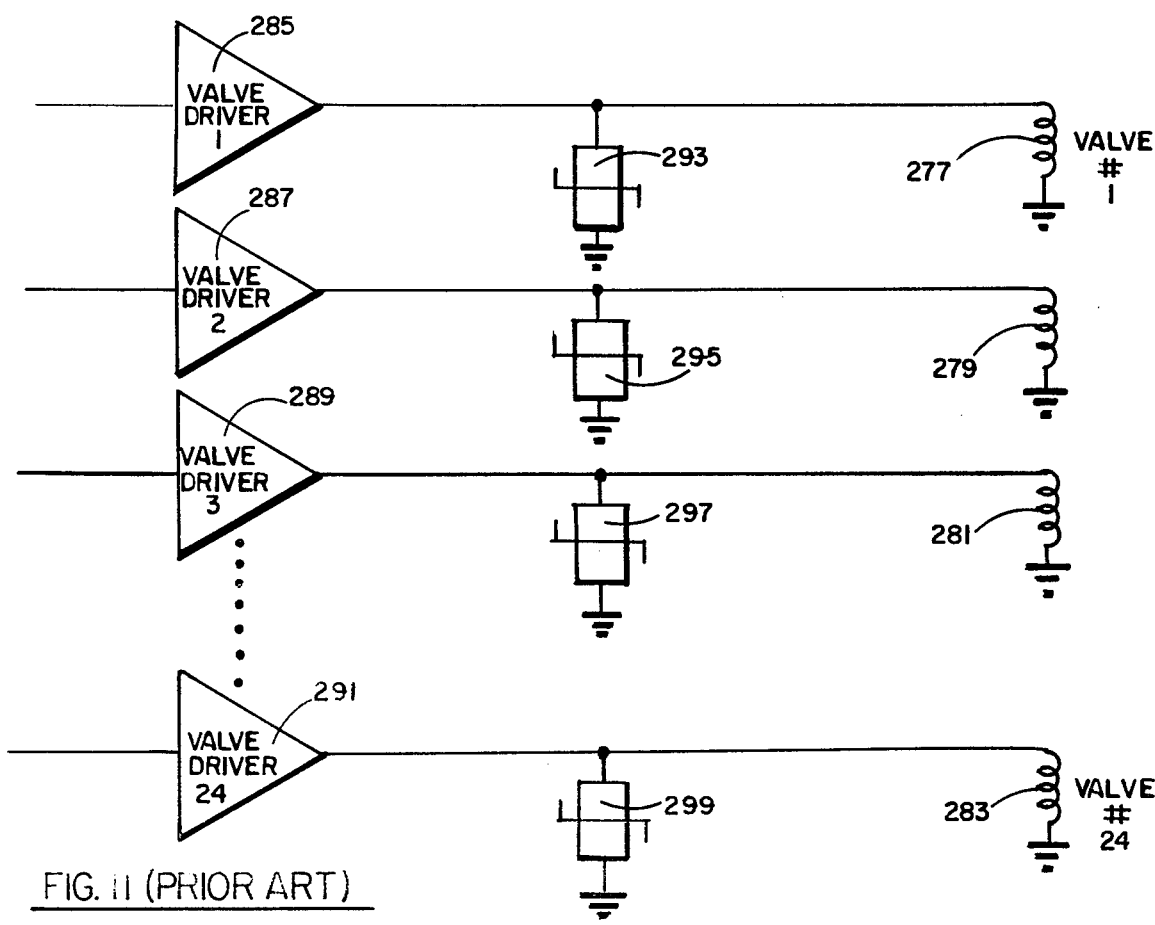
FIG. 11 is a comparison of prior art arrangements employing a separate driver for each operating device.

A comparison of FIGS. 10 and 11 shows one advantage of the present system over the prior art system. In FIG. 10, the single valve driver 173 is shown connected in the common lead 171 and to the lower deck 37 where the tab 161 makes successive contact with the valves No. 1 shown at 251, valve No. 2 shown at 253, valve No. 3 shown at 255, etc. These valves are selectively energized for the period of the commands.

It may also be appreciated that not only is the single valve driver 173 adequate in this unique arrangement for the valves of the entire plurality, but also only a single lightning protector means 275 need be employed to protect this valve driver. The resultant savings are very substantial over the prior art of FIG. 11 wherein each of the valves No. 1, shown at 277, No. 2 at 279, No. 3 at 281, and No. 24, for example, at 283, requires its own valve driver 285, 287, 289 and 291, as well as its own lightning protecting means 293, 295, 297 and 299.

Figure 6:
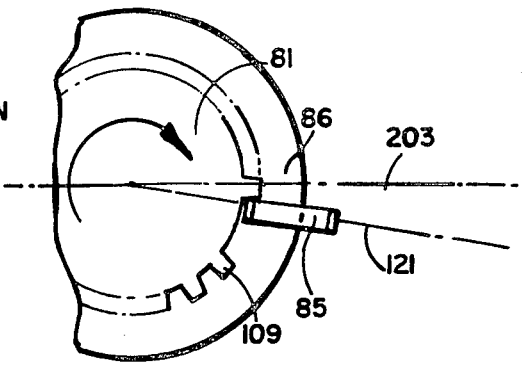
FIG. 6 is a detailed view of a portion of FIG. 4 to show the switch structure at the beginning of position contacting.
Figure 7:
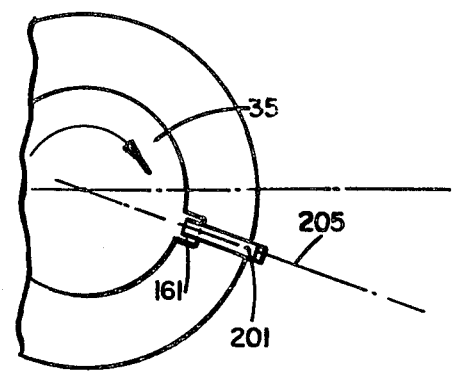
FIG. 7 is a similar view, but of the structure of FIG. 5 showing switching contact already made, views 6 and 7 being taken at the same instant of time and relative positioning.

Another feature of the invention may be seen from a comparison of FIGS. 6 and 7. Rotary conductor 81 of position deck 33 has been moved counterclockwise until tooth-like tab 86 is just making contact with terminal 85. In FIG. 7, it may be seen that tab 161 of rotary conductor 35 of switching deck is centered in spring clip 201. The angle of lead of rotary conductor 35 ahead of rotary conductor 81 is preferably 6 degrees and 51 minutes for the configuration shown. Obviously other similar angles will suffice. This angle may be measured between dashed lines 203 and 205. The reason for this is to position the tab 161 in the center of the selected lead switching clip, so that good contact is made before turning on the valve driver 173. After the driver is turned off by the microprocessor 123, the motor 23 then turns, thus preventing the switch 23 from breaking the load.

Having now described a preferred embodiment of the invention, it should be realized that any modifications to the switch and system above described within the scope of the appended claims are to be considered as a part of this invention, as the description is intended to be illustrative only and not to be otherwise limited.

What is claimed is:

1. A position sensing rotary switch comprising, in combination:
   a position deck having a pair of electrically isolated rotatable conductors;
   means for applying voltage to the conductors;
   means for detecting a home position from one of the conductors;
   means for detecting each position of the switch relative to said home position from the other of the conductors;
   a switching deck having a common rotatable conductor;
   means for applying voltage to the common conductor;
   means for establishing connections from the common conductor to a plurality of position outlets;
   means for spacing the decks apart with the respective rotatable conductors in predetermined orientation;
   means for rotating said conductors together;
   said one conductor of the position deck having a first surface with a single tab;
   said means for detecting a home position comprising a contact for engagement with said tab;
   said other conductor of the position deck having a plurality of teeth-like tabs corresponding to all switch positions except home position;
   said means for detecting each position of the switch comprising a position contact for engaging said teeth-like tabs singly;
   said position outlets comprising outlet contacts;
   the means for establishing connections from the common conductor comprising an outlet tab on said conductor for engagement with said outlet contacts; and
   said predetermined orientation locating the outlet tab on an outlet contact as the position contact is just making contact with a corresponding position teeth-like tab to insure good switching outlet contact at the time of determining position by the position deck.

2. A position sensing rotary switch system for selectively establishing electrical connections to a plurality of devices comprising, in combination:
   a rotary switch having a position deck wafer for position indication and a switching deck wafer for establishing connections respectively to said devices;
   motor means for driving said wafers together;
   a computer for powering the motor means in accordance with input positioning signals to cause it to rotate the switch to a predetermined position to establish a connection to a selected device;
   said position deck signalling the computer when the predetermined position is attained for the computer to interrupt the motor drive at said position;
   said computer establishing electrical connection to said selected device via the switching deck for the application of powering voltage thereto;
   a motor driver between said computer and the motor;
   a device driver in the electrical connection from the computer to the switching deck;
   lightning protection means in circuit with said device driver;
   said computer interposing a time delay between stopping the motor means at the predetermined position and the application of voltage to the selected device;
   said computer relieving the voltage application before starting the motor means;
   said rotary switch wafer further comprising a pair of electrically isolated rotatable conductors as a part of the position deck;
   means for applying voltage to the conductors;
   means for detecting a home position from one of the conductors;
   means for detecting each position of the switch relative to said home position from the other of the conductors;
   said switching deck having a common rotatable conductor;
   means for applying voltage to the common conductor;
   means for establishing connections from the common conductor to a plurality of position outlets connected respectively to said devices;
   means for spacing the decks apart with the respective rotatable conductors in predetermined orientations;
   said one conductor of the position deck having a first surface with a single tab;
   said means for detecting a home position comprising a contact for engagement with said tab;
   said other conductor of the position deck having a plurality of teeth-like tabs corresponding to all switch positions except home position;
   said means for detecting each position of the switch comprising a position contact for engaging said teeth-like tabs singly;
   said position outlets comprising outlet contacts;
   the means for establishing connections from the common conductor comprising an outlet tab on said conductor for engagement with said outlet contacts; and,
   said predetermined orientation locating the outlet tab on an outlet contact as the position contact is just making contact with a corresponding position teeth-like tab to insure good switching outlet contact at the time of determining position by the position deck.

3. A position sensing rotary switch system for selectively establishing electrical connections to a plurality of devices comprising, in combination:
   a rotary switch having a position deck means for position indication and a switching deck means for establishing connections respectively to said devices;

motor means for driving said deck means together;

a computer for powering the motor means in accordance with input positioning signals to cause it to rotate the switch to a predetermined position to establish a connection to a selected device;

said position deck means signalling the computer when the predetermined position is attained for the computer to interrupt the motor drive at said position;

said switching deck having a contact arm;

said computer establishing electrical connection to said selected device via said contact arm of the switching deck means for the application of powering voltage thereto;

each of said deck means having corresponding contacts, with the contacts of said switching deck means being offset from the contacts of said position deck means;

means for detecting the contacts of the position deck; and, the offset being such that when the detecting means is just making contact with a given contact of the positioning deck, the corresponding contact of the switching deck is already in contact with the contact arm thereof to insure good switching at the time of determining position by the position deck means.

* * * * *